Dec. 6, 1966 V. A. BRUCATO 3,289,274
CUTTING TOOL

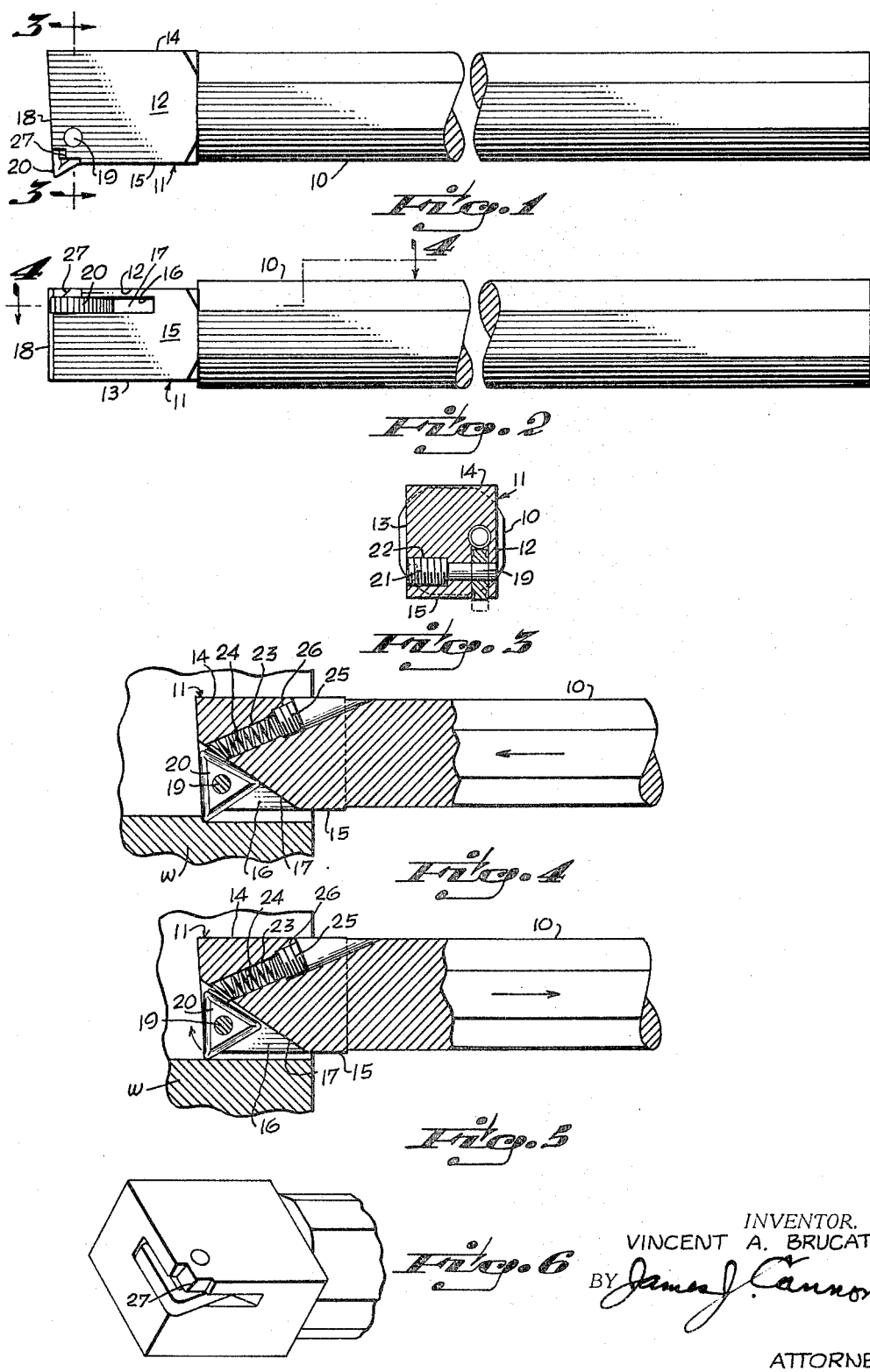

Filed May 3, 1965 2 Sheets-Sheet 2

INVENTOR.
VINCENT A. BRUCATO
BY James J. Cannon
ATTORNEY.

United States Patent Office 3,289,274
Patented Dec. 6, 1966

3,289,274
CUTTING TOOL
Vincent A. Brucato, 138 Orchard St., Garfield, N.J.
Filed May 3, 1965, Ser. No. 452,943
9 Claims. (Cl. 29—97.5)

My invention relates to metal cutting tools and is directed particularly to improvements in such tools used in facing, turning, boring, and the like, in the fabrication of metal parts.

In machining operations with the use of lathes, particularly automatic lathes, it is difficult, because of the slight resiliency of the work piece and tool support mechanism, to avoid so-called drag-back marks, tool return marks or phonographic finish on the work surface caused by withdrawal of the tool in the return stroke along the same path as the cutting stroke. While this can be avoided in manually operated lathes by withdrawing the tool cutter laterally at the completion of a cutting stroke and prior to its return stroke, it involves additional operations which slow down production.

It is accordingly the principal object of my invention to provide a cutting tool comprising a tool bit carrier having a cutter or bit supported in spring-loaded relation with respect to the carrier in such a manner as to permit resilient yielding of the cutting edge away from the work during the return stroke of the cutting tool, whereby drag-back marks and the like will be eliminated.

Another object of the invention is to provide a cutting tool of the above nature that is particularly well suited for use with triangular cutting bits, and which can readily be disassembled for replacement or changing of the angular tip of such a cutting bit being used.

Still another object is to provide a cutting tool of the character described which is compact in structure, simple in operation, easy to adjust, and dependable and long wearing in use.

Other objects, features and advantages of the invention will be apparent from the following description when read with reference to the accompanying drawings. In the drawings, wherein like reference numerals denote corresponding parts throughout the several views:

FIG. 1 is a side elevational view of a boring and facing tool embodying the invention;

FIG. 2 is a bottom view thereof;

FIG. 3 is a vertical cross-section thereof taken along the line 3—3 of FIG. 1 in the direction of the arrow;

FIG. 4 is a partial view, partly in vertical section, illustrating action of the tool in marking a cutting stroke on a work piece;

FIG. 5 is a view, similar to FIG. 4, but showing action of the tool during the return stroke;

FIG. 6 is a perspective view of the head portion of the tool, illustrating the chip-breaker slots formed therein adjacent the cutting tip;

Figures 7, 8, 9, 10:
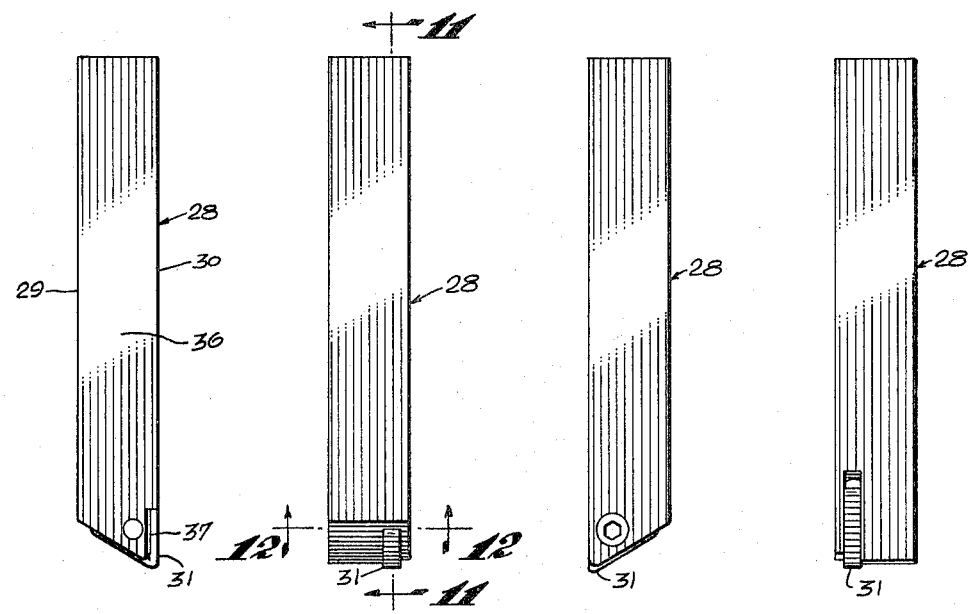
FIG. 7 is a side elevational view of a modification of the tool adapted to be used in a vertical tool holder for turning operations.
FIG. 8 is a rear elevational view of the tool shown in FIG. 7.
FIG. 9 is an elevational view of the other side thereof.
FIG. 10 is a front elevational view thereof.
Figure 11:
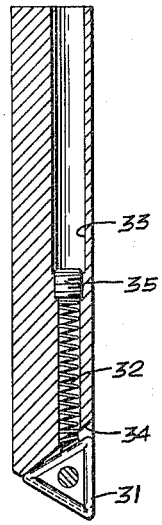
FIG. 11 is a vertical cross-sectional view taken along the line 11—11 of FIG. 8 in the direction of the arrows.
Figure 12:
FIG. 12 is a horizontal cross-sectional view taken along the line 12—12 of FIG. 8 in the direction of the arrows.

Referring now in detail to the drawings, the numeral 10 designates the elongated shank of a boring and facing tool embodying my invention, which may be of polygonal cross-sectional shape, at one end of which is integrally formed a tool head portion 11 which is preferably of rectangular cross-sectional shape, as best illustrated in FIG. 3, providing spaced, parallel side wall faces 12, 13, and spaced, parallel top and bottom wall faces 14 and 15, respectively. A cutter slot 16 of uniform width is formed in the underside of the tool head portion 11 in slightly spaced, parallel relation with respect to the side wall face 12, said slot having a flat bottom wall portion 17 and being cut at an angle so that said bottom wall portion at one end opens into the front face 18 of said tool head portion at a zone somewhat more than midway along its height, and at the other end opens into the bottom wall face 15 at a zone about two-thirds the distance along its length.

Pivotally journalled within the cutter slot 16, as by a pivot pin 19, is a flat, triangular cutting bit 20, of tungsten carbide or equivalent metal-cutting material, said slot being of such width as to provide for a sliding fit therein of said bit. The pivot pin 19 is integrally formed with a threaded head 21 removably received within an internally threaded transverse opening 22 in the tool head portion 11, as is best illustrated in FIG. 3. The cutting bit 20 is so located in the slot 16 that a cutting apex of the bit can project slightly from the bottom wall face 15 at the outer end of the tool head portion 11, in which position the opposite base portion of said bit is in slightly spaced relation with respect to the flat bottom wall portion 17 of said slot to permit limited rocking of said bit in said slot. As is best illustrated in FIG. 6, the corner of said wall face 12 of the tool head portion 11 adjacent the cutting apex of the bit is cut away at each side to provide a slightly recessed wall corner portion 27 which serves as a chip breaker during the metal cutting operations.

Means is provided for resiliently constraining the cutting bit 20 in its most anti-clockwise rocked position (as illustrated in FIG. 4), whereat the innermost apex of the bid is in abutment against the flat bottom wall portion 17 of the cutter slot 16. To this end, the tool head portion 11 of the tool shank 10 is provided with an oblique bore 23 intersecting the slot bottom wall portion 17 near the front end thereof, within which is disposed a helical compression spring 24 one end of which engages with the inside base portion of the cutting bit 20, and the other end of which is held in place in compressing relation by a screw plug 25 removably received in an internally-threaded outer end portion 26 of the bore 23.

FIG. 4 illustrates the use of my cutting tool in machining a work piece W, which may be revolving, for example, as the tool gradually moves forwardly, axially, as indicated by the arrow in a cutting stroke. It will be apparent that the projecting cutting edge or apex of the cutting bit 20 will be subjected to reactive forces imposed by the work as the tool moves forwardly, so that the bit is maintained in its most anti-clockwise position for the full extent of the cutting stroke. When the tool is withdrawn upon the completion of a cutting stroke or pass, however, the slightest resistance to free passage of the cutting bit imposed by the machined work surface by virtue of any slight resiliency of the intersecting work and tool structures involved, instead of cutting again on the return stroke, as in the case of ordinary fixed cutting bits, will instead cause the cutting bit 20 to be rotated clockwisely against the slight compressional forces of compression spring 24 to retract the projecting cutting apex of the bit and thereby eliminate any tool drag capable of marking or marring the work.

Referring now to the form of the invention illustrated in FIGS. 7 through 11, a modified embodiment of the tool particularly well suited for the use in metal turning while held in a vertical tool holder, the same comprises an elongated shank 28, which may be of square or rectangular cross-section, and the cutting tip end of which is beveled from the back face 29 to the front face 30 thereof to form a tip angle of substantially 60 degrees. As in the embodiment of the invention illustrated in FIGS. 1 through 6, the tip end of the tool is slotted at one side to receive pivotally supported and rockably disposed therein a triangular cutting bit 31. A compression spring 32 arranged in a longitudinal bore 33 in the tool shank 28 and entering the bit slot 34 bears against the inner base of the cutting bit near the front face of the tool, as best illustrated in FIG. 1. A set screw 35 within the bore 33 holds the spring 32 in place. As best illustrated in FIG. 7, the left-hand side wall face 36 of the cutting tool shank at the tip end is stepped or recessed to provide a chip-breaking edge 37. The operation of the spring loaded cutting bit 31 is as described above in connection with the embodiment of the invention illustrated in FIGS. 1 through 6.

While there are illustrated and described herein only two forms in which the invention may conveniently be embodied in practice, it is to be understood that these forms are presented by way of example, only, and not in a limiting sense. The invention, in brief, comprises all of the embodiments and modifications coming within the scope and spirit of the following claims.

What I claim as new and desire to secure by Letters Patent is:

1. A cutting tool comprising, in combination, an elongated shank member, a tool head portion at one end of said shank member, a triangular cutting bit having three base portions and three apices defining three cutting tips and being swingably supported with respect to said tool head portion and having one cutting tip projecting outwardly thereof in a transverse direction with respect to said shank member said cutting bit being swingably journalled about its axis of symmetry, abutment means limiting the swinging motion of said cutting bit at first and second end positions thereof, said one cutting tip projecting outwardly of said tool head portion by a greater amount when in said first than when in said second of said positions, and resilient means normally constraining said cutting bit into said first position.

2. A cutting tool as defined in claim 1 wherein said abutment means comprises a slot in said tool head portion within which said cutting bit is swinging journalled, said slot defining a bottom wall portion constituting an abutment surface for inner portions of said bit.

3. A cutting tool as defined in claim 2 wherein said resilient means comprises a helical compression spring extending into said slot and bearing at one end against an inner portion of said cutting bit.

4. A cutting tool comprising, in combination, an elongated shank member, a triangular cutting bit having three base portions and three apices defining three cutting tips and being rockably supported with respect to said shank member at one end thereof and having one cutting tip projecting outwardly thereof said cutting tip being rockably journalled about its axis of symmetry, abutment means limiting the rocking motion of said cutting bit at first and second positions thereof, said cutting tip projecting outwardly of said shank member by a greater amount when in said first than when in said second of said positions, and resilient means normally constraining said cutting bit in said first position.

5. A cutting tool as defined in claim 4 wherein said abutment means comprises a slot in said one end of said shank member within which said cutting bit is rockably journalled, said slot defining a bottom wall portion constituting an abutment surface for inner portions of said bit.

6. A cutting tool as defined in claim 5 wherein said resilient means comprises a helical compression spring extending into said slot and bearing at one end against an inner portion of said cutting bit.

7. A cutting tool comprising, in combination, an elongated shank member, a tool head portion at one end of said shank member, a cutting bit swingably supported with respect to said tool head portion and having a cutting tip projecting outwardly thereof in a transverse direction with respect to said shank member, abutment means limiting the swinging motion of said cutting bit at first and second end positions thereof, said cutting tip projecting outwardly of said tool head portion by a greater amount when in said first than when in said second of said positions, and resilient means normally constraining said cutting bit into said first position, said abutment means comprising a slot in said tool head portion within which said cutting bit is swingingly journalled, said slot defining a bottom wall portion constituting an abutment surface for inner portions of said bit, said resilient means comprising a helical compression spring extending into said slot and bearing at one end against an inner portion of said cutting bit, said cutting bit being of triangular shape to define three cutting tips and three base portions, said one end of said compression spring bearing against the base portion of said cutting bit opposite the projecting tip thereof at a position adjacent the outer end of said base portion.

8. A cutting tool comprising, in combination, an elongated shank member, a cutting bit rockably supported with respect to said shank member at one end thereof and having a cutting tip projecting outwardly thereof, abutment means limiting the rocking motion of said cutting bit at first and second positions thereof, said cutting tip projecting outwardly of said shank member by a different amount when in said first than when in said second of said positions, and resilient means normally constraining said cutting bit in said first position, said abutment means comprising a slot in said one end of said shank member within which said cutting bit is rockably journalled, said slot defining a bottom wall portion constituting an abutment surface for inner portions of said bit, said resilient means comprising a helical compression spring extending into said slot and bearing at one end against an inner portion of said cutting bit, said cutting bit being of triangular shape to define three cutting tips and three base portions, said one end of said compression spring bearing against the base portion of said cutting bit opposite the projecting tip thereof at a position adjacent the outer end of said base portion.

9. A cutting tool as defined in claim 8 including a recessed edge formed in said one end of said shank member adjacent said projecting tip and serving as a chip breaker.

References Cited by the Examiner
UNITED STATES PATENTS

Re. 5,277   2/1873   Ettenborough _____ 29—97.5
Re. 9,738   6/1881   Prindle _____ 29—97.5

WILLIAM W. DYER, JR., *Primary Examiner.*

HARRISON L. HINSON, *Examiner.*